Patented Aug. 27, 1929.

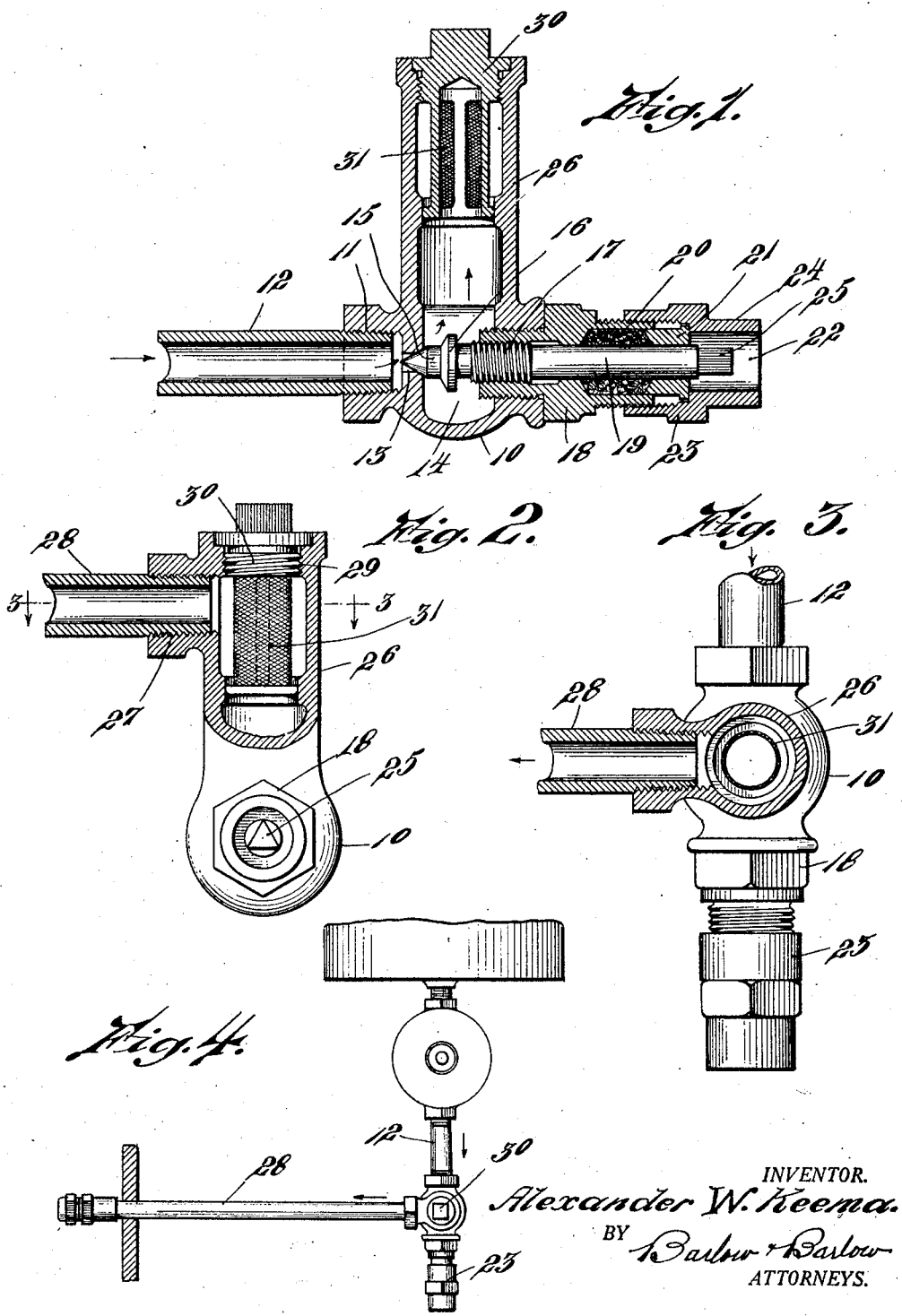

1,726,302

UNITED STATES PATENT OFFICE.

ALEXANDER W. KEEMA, OF WOONSOCKET, RHODE ISLAND.

SHUT-OFF VALVE.

Application filed March 20, 1928. Serial No. 263,146.

This invention relates to an improved construction of shut-off valve, more particularly adapted for use in a liquid fuel supply pipe line; and one of the objects of this invention is to provide a T-shaped unit construction of valve casing having an inlet at one end of the cross head, a closure valve for extending into the opposite end of the cross head and a discharge outlet in the shank portion of the T-shaped casing; also to support a fuel screen in the shank portion intermediate the inlet and the outlet openings.

A further object of the invention is the provision of a valve inlet closure member having a shank portion extending thru a stuffing box and the outer end of the shank being shaped to receive a socket wrench and this outer end being protected by a sleeve extension positioned especially to guard the stem from injury and from any set adjustments by unauthorized persons.

With these and other objects in view, the invention consists of certain novel features of construction, as will be more fully described, and particularly pointed out in the appended claims.

In the accompanying drawings:

Fig. 1 is a sectional side elevation of my improved shut-off valve showing the inlet closure member in closed position.

Fig. 2 is an end view of the shut-off valve partly broken away to illustrate the discharge opening in the shank portion of the casing and a screen thru which the discharged liquid must pass.

Fig. 3 is a top view showing the discharge opening in the shank portion of the T-shaped casing.

Fig. 4 is a view showing a general arrangement of piping between the supply tank and the furnace with my improved shut-off valve connected in the pipe line.

It is found in practice of advantage particularly in the arrangement of a liquid fuel burning apparatus to insert in the supply pipe line a valve by means of which the supply may be shut off or controlled; also to provide means for protecting the shut-off valve so that it will not become accidentally injured and also so that it can not be tampered with by unauthorized persons; also to form the valve body of a single casting so as to reduce the number of openings into the casing and so reduce the liability of air leaks to the minimum; also to provide a screen thru which the oil is filtered in passing thru the valve from the supply to the burner; and the following is a detailed description of the present embodiment of my invention showing one construction of valve by which these advantageous results may be accomplished:

With reference to the drawings, 10 designates the body or casing of the valve which is made in T-shape all in one casting. One end of the T-head is threaded as at 11 into which the supply pipe 12 is screwed and a reduced inlet opening 13 communicates with the valve chamber 14. This inlet opening is controlled by the pointed end 15 of the needle valve 16 which is threaded at 17 in the plug 18 and the stem portion 19 of this valve extends out thru the packing 20 and the packing gland 21 into the protecting sleeve 22.

The nut 23 which is provided for setting up the packing gland is also provided with an outwardly-extending sleeve portion 24 which projects over and forms a guard or casing for the operating end 25 of the valve stem 19. This end of the stem being herein shown as formed in V-shape as illustrated in Fig. 2 for the reception of a specially formed socket wrench and by extending the sleeve 22 over and beyond the wrench receiving end a guard is provided to protect this end against being inadvertently hit and so bent which would prevent quick closing of the valve in case of fire. Also by positioning this extended sleeve over the operating end, this valve is further safeguarded against being tampered with by unauthorized persons.

The shank portion 26 of this T-shaped one-piece casing casting is arranged to extend upwardly from the cross-head portion thereof and is provided near its upper end with a laterally disposed discharge outlet 27 which is threaded to receive the fuel conducting pipe 28.

The end of this shank portion 26 is threaded as at 29 to receive a plug 30 on the end of which is secured the tubular screen 31 thru which the oil passes on its way to the feed pipe 28 to the furnace.

By my improved construction of forming this valve casing as a single unit, the same is very strong and durable and all unnecessary joints thru which air might leak into the oil supply line, have been avoided.

The foregoing description is directed solely towords the construction illustrated, but I desire it to be understood that I reserve the privilege of resorting to all the mechanical changes to which the device is susceptible, the invention being defined and limited only by the terms of the appended claims.

I claim:

1. A shut off valve comprising a one piece T-shaped body casing, an inlet at one end of the cross head, a closure valve extending into the opposite end of the cross head controlling said inlet, the shank portion of the T having a discharge outlet, a screen removably supported intermediate said inlet and said outlet from the end of the stem portion.

2. A shut off valve comprising a one piece T-shaped body casing, an inlet at one end of the cross head, a closure valve extending into the opposite end of the cross head controlling said inlet, said closure member having a stem shaped in its operating end to receive a wrench, a protecting sleeve extending over said end, the shank portion of the T-shaped casing having a plug in its end, a discharge opening in the side of said shank, and a screen supported on said plug to extend over said shank opening thru which the outflowing fuel must pass.

In testimony whereof I affix my signature.

ALEXANDER W. KEEMA.